(12) United States Patent
Harty, Sr. et al.

(10) Patent No.: US 8,286,586 B2
(45) Date of Patent: Oct. 16, 2012

(54) MILK LINER

(75) Inventors: Edmond Patrick Harty, Sr., Kerry (IE);
Edmond Patrick Harty, Jr., Kerry (IE)

(73) Assignee: Dewvale Limited, Tralee (IE)

( * ) Notice: Subject to any disclaimer, the term of this patent is extended or adjusted under 35 U.S.C. 154(b) by 0 days.

(21) Appl. No.: 10/557,250

(22) PCT Filed: May 17, 2004

(86) PCT No.: PCT/IE2004/000073
§ 371 (c)(1),
(2), (4) Date: Mar. 3, 2006

(87) PCT Pub. No.: WO2004/100651
PCT Pub. Date: Nov. 25, 2004

(65) Prior Publication Data
US 2006/0283392 A1    Dec. 21, 2006

(30) Foreign Application Priority Data

May 16, 2003 (IE) .................................. S2003/0371

(51) Int. Cl.
*A01J 5/04* (2006.01)
*A01J 5/00* (2006.01)

(52) U.S. Cl. .................. 119/14.49; 119/14.54

(58) Field of Classification Search ............... 119/14.54, 119/14.47
See application file for complete search history.

(56) References Cited

U.S. PATENT DOCUMENTS

| 951,403 | A | * | 3/1910 | Lane | ........................... 119/14.54 |
| 2,282,159 | A | | 5/1942 | Berndt | |
| 2,944,514 | A | | 7/1960 | Nesseth | |
| 4,457,262 | A | * | 7/1984 | Mills | ........................... 119/14.47 |

FOREIGN PATENT DOCUMENTS

| GB | 491694 | * | 9/1938 |
| WO | 9819519 A1 | | 5/2008 |

OTHER PUBLICATIONS

Intellectual Property Office of New Zealand IP Summary Report for Application 334993 dated Dec. 18, 2000, corresponding to EP97/04562.

* cited by examiner

*Primary Examiner* — Monica Williams
(74) *Attorney, Agent, or Firm* — Sughrue Mion, PLLC

(57) ABSTRACT

A milk liner assembly (1) comprises a milk liner (5) seal ably located in an outer shell (3) and defining with the outer shell (3) a pulsating vacuum chamber (23). The milk liner (5) comprises a sleeve (8) and a teat engaging flange (25) which together define a teat receiving cavity (11). A teat accommodating opening (26) through the teat engaging flange (25) accommodates a teat into the teat receiving cavity (11). A strengthening ring (28) integrally formed with the sleeve (8) is located on the sleeve (8) and extends around the sleeve (8) adjacent the teat engaging flange (25) for minimizing excessive radial inward contraction of the sleeve (8), and in turn excessive radial inward contraction of the teat engaging flange (25) onto the teat so that even if the teat engaging flange (25) were to engage the cricoid fold, milk flow through the cricoid fold would not be inhibited by the gripping pressure exerted the teat engaging flange (25) on the cricoid fold. The strengthening ring (28) extends axially from the sleeve (8), and terminates in a distal abutment surface (30) for abutting the udder of the animal for in turn spacing the teat engaging flange (25) from the udder and from the cricoid fold.

11 Claims, 2 Drawing Sheets

MILK LINER

This is a National Stage entry of International Application PCT/IE04/00073, with an international filing date of May 17, 2004, which was published as WO 2004/100651 A1, and the complete disclosure of which is incorporated into this application by reference.

BACKGROUND OF THE INVENTION

The present invention relates to a milk liner for a milk liner assembly of an animal milking system, and in particular, though not limited to a milking system for milking cows. The invention also relates to a milk liner assembly, as well as to a milking cluster for use in a milking system, and the invention relates to a method for minimising excessive radial inward contraction, during milking of an animal, of a teat engaging flange of a milk liner onto a teat of an animal passing therethrough.

Milk liner assemblies for use in milking systems for milking cows are provided in groups of four which are commonly referred to as a milking cluster. Each milk liner assembly of the cluster is provided for engaging one of the teats extending downwardly from a cow's udder. The milk liner assembly comprises an outer shell, typically of stainless steel, within which is located a milk liner of a resilient flexible synthetic rubber material. The milk liner forms a teat receiving cavity for receiving a teat from the cow's udder. One end of the milk liner terminates in a teat engaging flange which defines a teat accommodating opening for accommodating the teat of the cow's udder into the teat receiving cavity. The other end of the milk liner terminates in an outlet port to which a milking vacuum is applied for drawing milk from the teat receiving cavity, which has been expressed from the cow's teat. The milk liner forms with the outer shell an annular vacuum chamber which extends around the milk liner, and to which a pulsating vacuum is applied. The pulsating vacuum applied to the annular vacuum chamber co-operates with the vacuum applied to the teat receiving cavity for pulsing the milk liner into tight radial engagement with the teat in the teat receiving cavity for massaging the teat during milking.

One problem with such milk liner assemblies is that during periods of no vacuum in the annular vacuum chamber around the milk liner between vacuum pulses during each pulsating vacuum cycle, when the milk liner is tightly urged into engagement with the teat, the milking vacuum applied to the teat receiving cavity tends to draw the teat into the teat receiving cavity, thus causing the milk liner to creep along the teat towards the cow's udder. This causes serious problems during milking, particularly when the milk liner assembly has crept along the teat to the extent that the teat engaging flange at the end of the milk liner commences to engage the cricoid fold at the root of the teat where it extends from the udder. On engagement of the cricoid fold the teat engaging flange contracts around the cricoid fold, thus closing off the supply of milk from the udder to the teat. This, thus, may prevent further milking of the cow from the teat, and in general, prevents a cow being completely milked.

In order to prevent creeping of the milk liner, and in turn the milk liner assembly along a teat, it is known to increase the weight of the milking cluster. Since milking clusters depend downwardly from the cow's udder, the increase in weight urges the milk liner assemblies, and in turn the milk liners downwardly against the action of the milking vacuum, thereby to some extent preventing creep of the milk liner upwardly along the teat. However, increasing the weight of a milking cluster is undesirable, since firstly, there is no guarantee that the extra increase in weight will be sufficient for preventing creep of the milk liner along the teat, and secondly, the extra weight of the milking cluster militates against efficient milking, particularly where a large number of cows are to be milked, since the extra weight reduces the speed at which the milking clusters can be attached to and detached from the teats of the cows. An alternative method for preventing creep along the teat is to empirically match the diameter of the teat accommodating opening defined by the teat engaging flange of the milk liner to the teat size of the herd. This, in general, is impractical.

There is therefore a need for a milk liner which overcomes the problem of creep of a milk liner along a teat to which the milk liner is attached.

SUMMARY OF THE INVENTION

The present invention is directed towards providing such a milk liner, and the invention is also directed towards providing a milk liner assembly and a milk liner cluster, for an animal milking system, as well as a method for minimising excessive radial inward contraction, during milking of an animal, of a teat engaging flange of a milk liner onto a teat of an animal passing therethrough.

According to the invention there is provided a milk liner for a milk liner assembly of an animal milking system, the milk liner comprising a resilient flexible elongated sleeve forming a teat receiving cavity for receiving a teat of an animal's udder and defining a longitudinally extending central axis, a teat engaging flange extending circumferentially around and radially inwardly from the sleeve, and forming with the sleeve the teat receiving cavity, the teat engaging flange defining a teat accommodating opening therethrough for accommodating a teat into the teat receiving cavity, wherein a strengthening means is provided for minimising excessive radial contraction of the teat engaging flange onto a teat extending through the teat accommodating opening thereof, the strengthening means being such as not to prevent axial deflection of the teat engaging flange.

In one embodiment of the invention the strengthening means strengthens the sleeve adjacent the teat engaging flange. Preferably, the strengthening means is located adjacent the teat engaging flange. Advantageously, the strengthening means is located adjacent the sleeve. Ideally, the strengthening means is located relative to the sleeve, so that the teat engaging flange extends radially from the strengthening means and the sleeve.

In another embodiment of the invention the strengthening means extends around the sleeve. Preferably, the strengthening means is of annular construction. Advantageously, the strengthening means comprises a strengthening ring.

In another embodiment of the invention the strengthening means extends in a general axial direction from the end of the sleeve adjacent which the teat engaging flange is located. Preferably, the strengthening means acts as a spacing means for spacing the teat engaging flange from the udder, the strengthening means terminating in an abutment surface for abutting the udder of the animal. Advantageously, the abutment surface of the strengthening means is axially spaced apart from the teat engaging flange so that the teat engaging flange engages the teat spaced apart from the cricoid fold on the axial end of the cricoid fold opposite to the end thereof adjacent the udder.

In one embodiment of the invention the axial distance between the abutment surface of the strengthening means and the teat engaging flange is at least 2 mm. Preferably, the axial distance between the abutment surface of the strengthening means and the teat engaging flange is in the range of 2 mm to 20 mm. Advantageously, the axial distance between the abutment surface of the strengthening means and the teat engaging flange is approximately 4 mm.

In one embodiment of the invention the radial thickness of the strengthening means is in the range of 2 mm to 20 mm. Preferably, the radial thickness of the strengthening means is in the range of 4 mm to 10 mm. Advantageously, the radial thickness of the strengthening means is approximately 6 mm.

In another embodiment of the invention the sleeve extends from the teat engaging flange and terminates in an outlet port to which a milking vacuum is applied for drawing milk from the teat. Preferably, the sleeve tapers towards the outlet port.

In one embodiment of the invention the strengthening means is integrally formed with the sleeve.

In another embodiment of the invention the teat engaging flange is integrally formed with the sleeve.

In a further embodiment of the invention the milk liner is integrally moulded in one piece. Preferably, the milk liner is integrally moulded of a synthetic custom rubber compound.

In one embodiment of the invention the milk liner is adapted for fitting a teat of a cow.

The invention also provides a milk liner assembly comprising a milk liner according to the invention, and an outer shell within which the milk liner is sealably located, and defining with the outer shell an annular chamber to which a pulsating vacuum is applied.

Further the invention provides a milking cluster comprising a plurality of milk liner assemblies according to the invention.

In one embodiment of the invention the milking cluster comprises four milk liner assemblies.

The invention also provides a method for minimising excessive radial inward contraction, during milking of an animal, of a teat engaging flange of a milk liner onto a teat of an animal passing through a teat accommodating opening defined by the teat engaging flange, the method comprising the step of providing a strengthening means for minimising the excessive contraction of the teat engaging flange, while permitting axial deflection of the teat engaging flange in an axial direction relative to the milk liner.

In one embodiment of the invention the strengthening means is located for strengthening the sleeve adjacent the teat engaging flange, and preferably, the strengthening means is located adjacent the teat engaging flange. Advantageously, the strengthening means is located adjacent the sleeve, and ideally, the strengthening means extends around the sleeve.

The advantages of the invention are many. By virtue of the fact that the milk liner comprises a strengthening means for minimising excessive radial contraction of the teat engaging flange onto a teat extending through the teat accommodating opening thereof, there is no danger of the teat engaging flange gripping the teat with an excessive gripping pressure, and thus, even should the teat engaging flange engage the cricoid fold between the teat and the udder, since radial inward contraction of the teat engaging flange is minimised, and in many cases will be eliminated, there is no danger of the teat engaging flange gripping the cricoid fold with a gripping pressure which would prevent or inhibit milk flow from the udder to the teat. Indeed, in general, the strengthening means prevents any radial inward contraction of the teat engaging flange onto the teat or the cricoid fold as the case may be. A further advantage of the invention is achieved when the strengthening means is located so as not to inhibit axial deflection of the teat engaging flange. By permitting the teat engaging flange to deflect axially during milking, the possibility of the milk liner assembly creeping upwardly along the teat to the udder is minimised.

By providing the strengthening means extending axially from the sleeve and terminating in an abutment surface for abutting the udder, a further advantage of the invention is provided in that even should the milk liner assembly creep upwardly along the teat, when the abutment surface of the strengthening means abuts the udder of the animal, the strengthening means spaces the teat engaging flange a sufficient distance from the udder in order to prevent engagement of the teat engaging flange with the cricoid fold.

The provision of the strengthening means on the sleeve, as opposed to locating the strengthening means on the teat engaging flange has the further advantage that the strengthening means provides all the strength necessary for minimising excessive inward radial contraction of the teat engaging flange onto the teat, while at the same time permitting axial deflection of the teat engaging flange.

BRIEF DESCRIPTION OF THE DRAWINGS

The invention will be more clearly understood from the following description of a preferred embodiment thereof, which is given by way of example only, with reference to the accompanying drawings, in which.

DETAILED DESCRIPTION OF THE INVENTION

Figure 1:
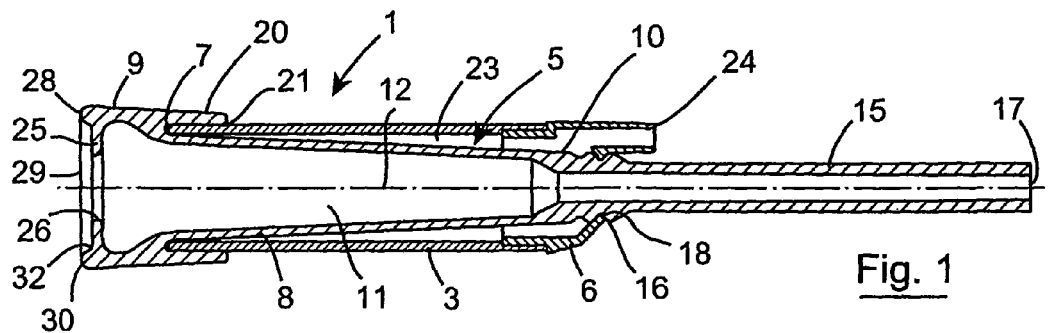
FIG. 1 is a transverse cross-sectional side elevational view of a milk liner assembly according to the invention.
Figure 2:
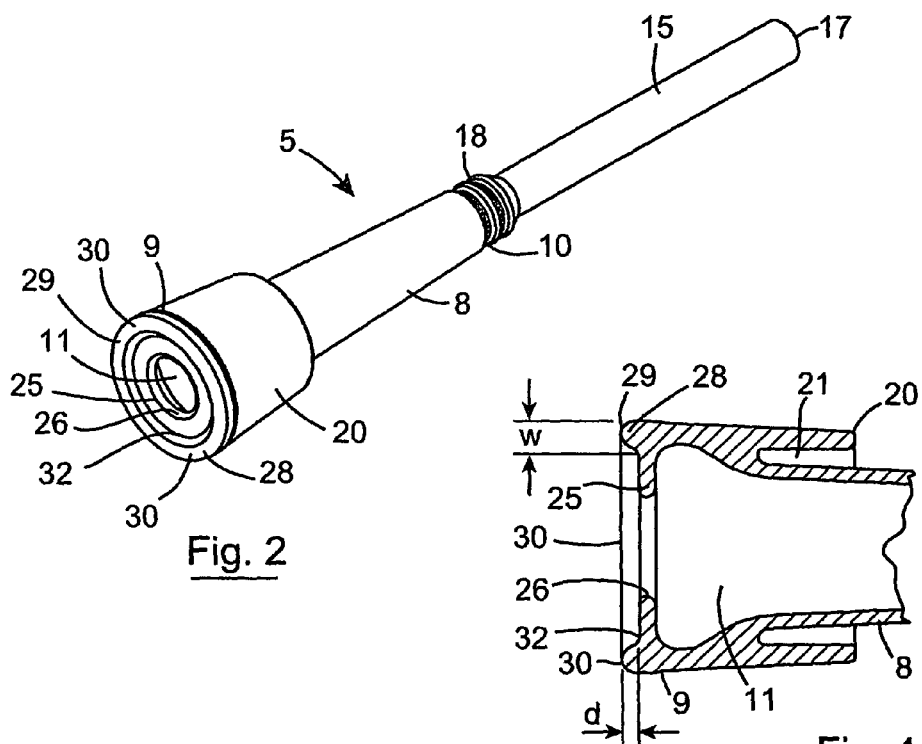
FIG. 2 is a perspective view of a milk liner also according to the invention of the milk liner assembly of FIG. 1.

Referring to the drawings, there is illustrated a milk liner assembly according to the invention, indicated generally by the reference numeral 1 of a milking cluster 2 also according to the invention for a vacuum operated milking system (also not shown). In this embodiment of the invention the milk liner assembly 1 and the milking cluster 2 are suitable for milking cows. As will be described below with reference to FIG. 5, each milking cluster 2 comprises four milk liner assemblies 1, one for attaching to each teat of a cows udder. Such vacuum operated milking systems will be well known to those skilled in the art, and further description of such systems should not be required.

The milk liner assembly 1 comprises an outer shell 3 typically of stainless steel material, and a milk liner also according to the invention, indicated generally by the reference numeral 5, located within the outer shell 3. The outer shell 3 is of circular transverse cross-section, and terminates at one end in a hemispherical end cap 6, and at its other end in an open mouth 7. The milk liner 5 is of a resilient flexible synthetic custom rubber compound and is integrally formed by injection moulding in one piece.

The milk liner 5 comprises an elongated sleeve 8 of circular transverse cross-section, which extends between an upstream end 9 and a downstream end 10, and extends into the outer shell 3 from the open mouth 7. The sleeve 8 defines a longitudinally extending central axis 12, and forms a teat receiving cavity 11 for receiving one of the teats of a cow's udder, and tapers towards the downstream end 10. An outlet tube 15 extends from the sleeve 8 through an opening 16 in the end cap 6 of the outer shell 3. The outlet tube 15 is of circular transverse cross-section, and terminates in an outlet port 17 to which a milking vacuum is applied for drawing milk from the teat receiving cavity 11 expressed from the teat. A circumferential recess 18 extending circumferentially around the outlet tube 15 sealably engages the end cap 6 adjacent the opening 16.

A lip 20 extending circumferentially around the sleeve 8 adjacent the upstream end 9 extends from the sleeve 8 in a general axial downstream direction, and defines with the sleeve 8 an annular groove 21 for sealably engaging the outer shell 3 adjacent the open mouth 7. The milk liner 5 sealably engaged to the outer shell 3 in the annular groove 21 and sealably engaged to the end cap 6 of the outer shell 3 defines with the outer shell 3 an annular vacuum chamber 23, to which a pulsating vacuum is applied through a pulsating vacuum port 24 formed in the end cap 6.

A teat engaging flange 25 extends circumferentially around and radially inwardly from the sleeve 8 adjacent the upstream end 9 thereof, and forms the teat receiving cavity 11 with the sleeve 8. The teat engaging flange 25 defines a teat accommodating opening 26 for accommodating a teat into the teat receiving cavity 11. The thickness of the teat engaging flange 25, which effectively determines its flexibility and resilience is such as to permit axial deflection of the teat engaging flange 25 relative to the sleeve 8 during milking as the vacuum applied to the pulsating vacuum port 24 is pulsed.

Figure 4:
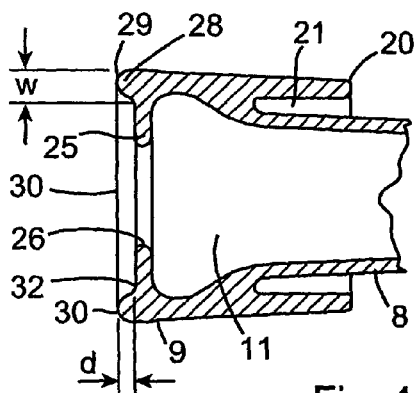
FIG. 4 is an enlarged transverse cross-sectional view of a portion of the milk liner of FIG. 2.
Figure 3:
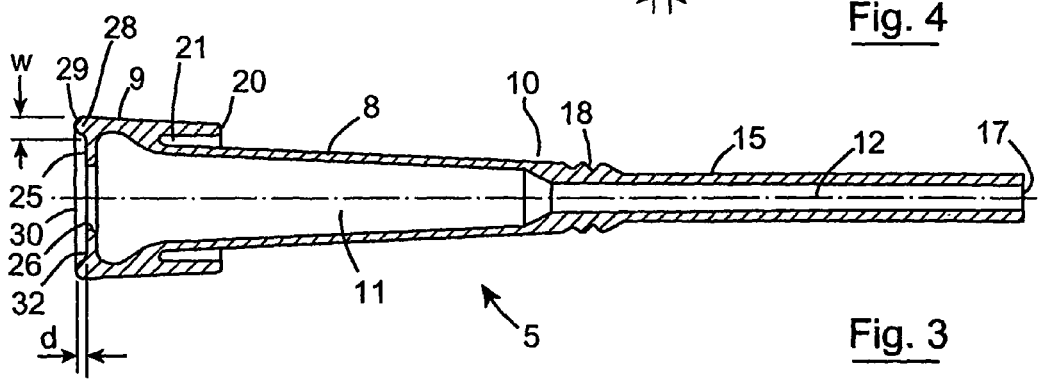
FIG. 3 is a transverse cross-sectional side elevational view of the milk liner of FIG. 2.

A strengthening means, in this embodiment of the invention a strengthening ring 28 extends circumferentially around and in a general axial direction from the sleeve 8 adjacent the upstream end 9 thereof for strengthening the sleeve 8 adjacent the teat engaging flange 25. The strengthening ring 28 is dimensioned for minimising radial inward contraction of the sleeve 8 adjacent the teat engaging flange 25, and thereby in turn minimising radial inward contraction of the teat engaging flange 25 onto the teat adjacent the teat accommodating opening 26, for preventing excessive gripping action being applied to the teat by the teat engaging flange 25. The strengthening ring 28 terminates in a distal axial end 29, which is radiused to form a convex abutment surface 30 for abutting the udder of the cow in the event of the milk liner assembly 1 creeping along the teat towards the udder. The axial distance d, see FIGS. 3 and 4, between the abutment surface 30 and the teat engaging flange 25 is approximately 4 mm for spacing the teat engaging flange 25 from the cricoid fold adjacent the root of the teat, when the abutment surface 30 is in abutting engagement with the udder. Additionally, the strengthening ring 28 is of radial width w of approximately 6 mm adjacent its root 32 where it extends from the sleeve 8 adjacent the teat engaging flange 25. The strengthening ring 28 sufficiently strengthens the sleeve 8 for minimising radial inward contraction of the sleeve 8, and in this embodiment of the invention the provision of the strengthening ring 28 of axial length 4 mm and radial width 6 mm is sufficient for preventing radial inward contraction of the sleeve 8, and in turn the teat engaging flange 25, thereby avoiding excessive gripping pressure being applied to the teat by the teat engaging flange 25 adjacent the teat accommodating opening 26.

However, in this embodiment of the invention, since the strengthening ring 28 is provided on the sleeve 8 adjacent the teat engaging flange 25, while the strengthening ring 28 strengthens the sleeve 8 for preventing radial inward contraction of the teat engaging flange 25 onto the teat, the strengthening ring 28 does not inhibit axial deflection of the teat engaging flange 25 relative to the sleeve 8. Thus, the teat engaging flange 25 is free to deflect in a general axial direction inwardly and outwardly relative to the teat receiving cavity 11 during each pulsating vacuum cycle, thereby minimising the possibility of creep of the milk liner 5, and in turn the milk liner assembly 1 along the teat.

In this embodiment of the invention the milk liner 5 including the sleeve 8, the outlet tube 15, the lip 20, the teat engaging flange 25 and the strengthening ring 28 are integrally injection moulded in one piece, and as described above are injection moulded of a synthetic custom rubber compound.

Figure 5:
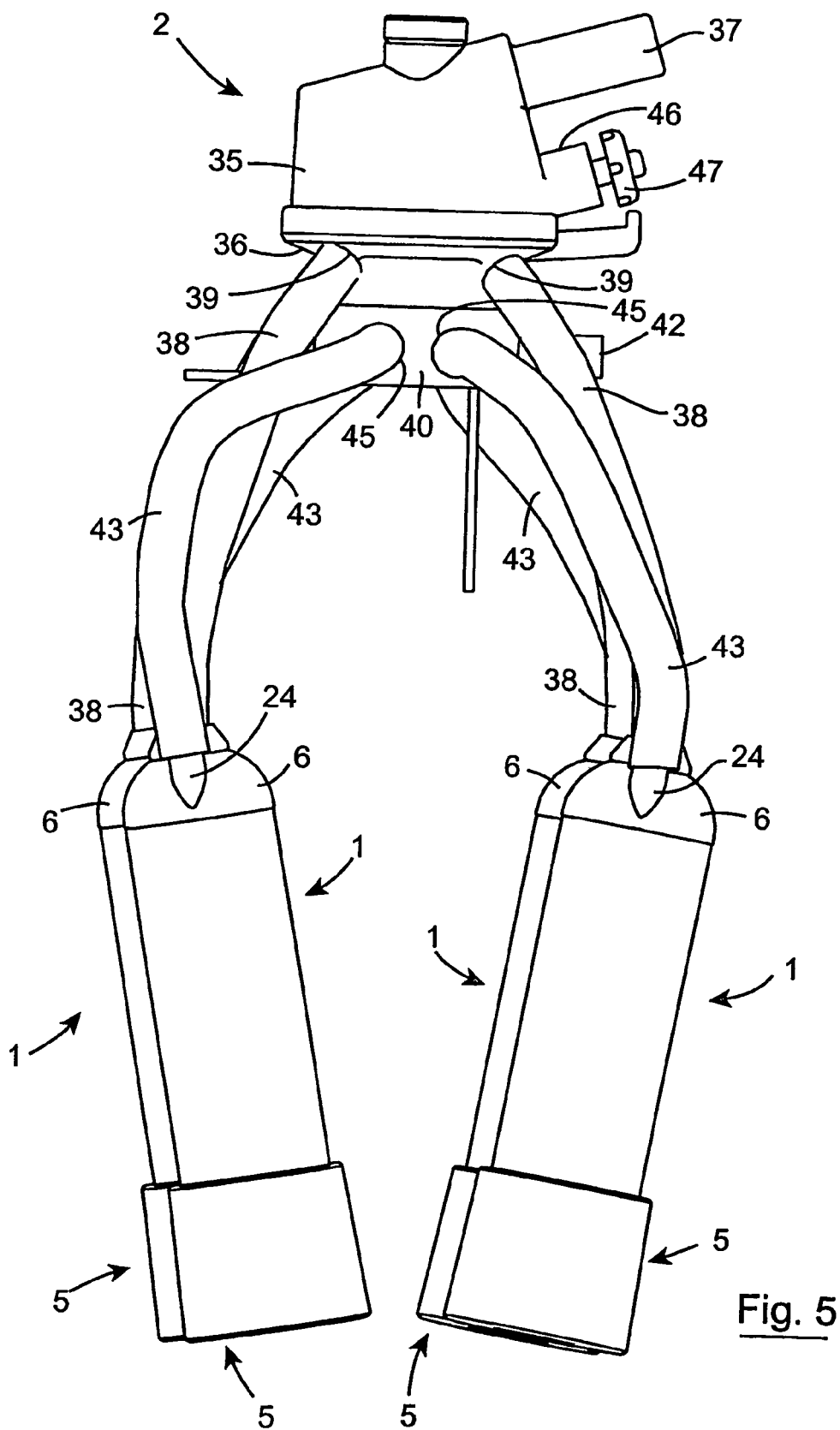
FIG. 5 is a perspective view of a milking cluster also according to the invention comprising four of the milk liner assemblies of FIG. 1.

Referring now in particular to FIG. 5, the milking cluster 2 comprises four milk liner assemblies 1, which are coupled to a central unit 35 which is commonly referred to as a claw. The central unit 35 comprises a main manifold 36 to which the milking vacuum is applied from the milking system through a main inlet vacuum port 37. Four main vacuum tubes 38 couple the outlet ports 17 of the respective milk liner assemblies 1 to main vacuum outlet ports 39 from the main manifold 36 for applying the milking vacuum from the main manifold 36 to the respective milk liner assemblies 1. The central unit 35 also comprises a secondary manifold 40 to which the pulsating vacuum from the milking system is applied through a secondary vacuum inlet port 42. Four secondary vacuum tubes 43 couple the pulsating vacuum ports 24 of the respective milk liner assemblies 1 to secondary vacuum outlet ports 45 for applying the pulsating vacuum from the secondary manifold 40 to the respective milk liner assemblies 1. A valve 46 operable by a hand operated knob 47 is provided for selectively isolating the main manifold 36 from the main inlet vacuum port 37 for facilitating removal of the milk liner assemblies 1 from the teats of a cow, and when the milk liner assemblies 1 are detached from the teats of a cow.

In use, with the milk liner 5 of the milk liner assembly 1 located within the outer shell 3, and sealably engaging the outer shell 3 in the annular groove 21 and sealably engaging the end cap 6 in the circumferential recess 18 to form the annular vacuum chamber 23, each milk liner assembly 1 is ready for use. Four of the milk liner assemblies 1 are coupled to the central unit 35 of each milking cluster 2 by the main and secondary vacuum tubes 38 and 43, and the milking clusters 2 are coupled to the milking system (not shown) by the main and secondary vacuum inlet ports 37 and 42. The milking system (not shown) is then ready for use.

The milk liner assemblies 1 of the milking clusters 2 are urged onto the teats of the respective cows to be milked, with each teat extending into the corresponding teat receiving cavity 11 of the corresponding milk liner assembly 1 through the teat accommodating opening 26. The milk liner assemblies 1 are then urged upwardly along the respective teats of the cows until the teats are adequately located within the respective teat receiving cavities 11. As all four milk liner assemblies 1 of each milking cluster 2 are engaged on the four teats of the cow, the hand knob 47 of that milking cluster 2 is operated for applying the milking vacuum to the milk liner assemblies 1 for commencing milking. The pulsating vacuum is already being applied to the vacuum chamber 23, and so milking progresses. If desired, the milking vacuum may be applied to the milk liner assemblies 1 as the milk liner assemblies 1 are being attached to the teats of the cow for assisting in urging the milk liner assemblies 1 onto the teats.

During periods of the pulsating vacuum cycle when no vacuum is applied to the vacuum chamber 23 between vacuum pulses, the action of the vacuum in the teat receiving cavity 11 urges the sleeve 8 of the milk liner 5 into tight engagement with the teat for massaging thereof. During periods of the pulsating vacuum cycle when vacuum is applied to the vacuum chamber 23, the sleeve 8 of the milk liner 5 is urged radially outwardly relative to the teat, thereby permitting milk to flow from the udder into the teat, which is then drawn from the teat by the milking vacuum applied to the teat receiving cavity 11.

The strengthening ring 28 of each milk liner 5 strengthens the sleeve 8 of the milk liner 5 adjacent the teat engaging flange 25 sufficiently to prevent radial inward contraction of the sleeve 8 adjacent the teat engaging flange 25. The fact that the sleeve 8 is sufficiently strengthened by the strengthening ring 28 to prevent radial inward contraction, in turn prevents radial inward contraction of the teat engaging flange 25. Accordingly, there is no danger of the teat engaging flange 25 contracting excessively onto the teat extending through the teat accommodating opening 26, and even if some minor contraction of the teat engaging flange 25 does take place onto the teat of the animal, any such contraction will be minimal. Accordingly, even if the milk liner assembly 1 creeps up along the teat to the udder to the extent that the teat engaging flange 25 engages the cricoid fold, by virtue of the fact that radial inward contraction of the teat engaging flange 25 is prevented or at least minimised, there is no danger of the teat engaging flange 25 contracting onto the cricoid fold to the extent that milk flow from the udder to the teat is inhibited.

The fact that the strengthening ring 28 extends axially from the sleeve 8 and also from the teat engaging flange 25 and terminates in the abutment surface 30 results in the strengthening ring 28 acting as a spacing means for spacing the teat engaging flange 25 from the udder in the event of the milk liner assembly 1 creeping up the teat to the extent that the abutment surface 30 of the strengthening ring 28 engages the udder. The axial length of the strengthening ring 28 and thus, the axial distance d between the teat engaging flange 25 and the abutment surface 30 of the strengthening ring 28 is such as to space the teat engaging flange a sufficient distance from the udder when the abutment surface 30 is abutting the udder, such that the teat engaging flange engages the teat at a location spaced apart from the cricoid fold, on the end of the cricoid fold opposite to the end of the cricoid fold adjacent the udder. In other words, the teat engaging flange 25 is spaced apart from the udder for engaging the teat on the downstream side of the cricoid fold and spaced apart therefrom.

However, even if the axial spacing between the abutment surface 30 and the teat engaging flange 25 is insufficient in the case of some animals for preventing the teat engaging flange 25 engaging the cricoid fold, since the strengthening ring 28 strengthens the sleeve 8, and in turn the teat engaging flange 25 for preventing radial inward contraction of the teat engaging flange 25, there is no danger of the teat engaging flange 25 contracting onto the cricoid fold to the extent which would prevent milk flow from the udder to the teat through the cricoid fold. Additionally, by virtue of the fact that the strengthening ring 28 is provided on the sleeve adjacent the teat engaging flange 25, the strengthening ring 28 has no effect on the axial flexibility of the teat engaging flange 25, and thus, the teat engaging flange is free to deflect in an axial direction during milking and during each pulsating vacuum cycle which further minimises the possibility of the milk liner assembly 1 creeping upwardly along the teat.

Since there is little danger of the milk liner assembly creeping up the teat to the extent that the teat engaging flange 25 would engage the cricoid fold, and even if the teat engaging flange 25 were to engage the cricoid fold, there is no danger of the teat engaging flange 25 contracting onto the cricoid fold to the extent that milk flow through the cricoid fold would be inhibited, the milk liner assembly, and in turn the cluster comprising four of the milk liner assemblies 1 can be provided to be of relatively light weight. It has been found that the weight of a typical milking cluster according to the invention using milk liner assemblies according to the invention can be reduced by 1.2 kg over prior art milking clusters. A typical prior art milking cluster weighs in the order of 3.2 kg. The milking cluster according to the invention comprising four milk liner assemblies also according to the invention can be provided to have a total weight of not more than 2 kg, and there is virtually no danger of the milking clusters according to the invention of total weight of 2 kg creeping along the teats of a cow. The fact that the milking cluster according to the invention can be provided of significantly less weight than milking clusters known heretofore has a particular advantage, in that it leads to a significant increase in milking efficiency, due t the fact that lighter weight milking clusters can more readily and easily be attached to and detached from a cow. This, thus, significantly speeds up the rate at which milking clusters can be attached to and detached from cows during milking. Additionally, in a relatively large herd size, which typically could be of the order of two hundred cows, where the cows are to be milked twice per day, the reduction in weight having to be handled by an operative in attaching the milking clusters according to the invention to the cows and removing the milking clusters therefrom is in the order of 480 kg per day.

While the strengthening means for minimising radial inward contraction of the teat engaging flange has been described as being a strengthening ring, any other suitable strengthening means may be provided, and while it is desirable that the strengthening means should also act as a spacing means for spacing the teat engaging flange from the cricoid fold, this is not essential, and indeed, in certain cases, it is envisaged that a separate spacing means may be provided which would act as an abutment member for abutting the udder of the animal and for in turn spacing the teat engaging flange from the udder, and in turn the cricoid fold.

While the strengthening means has been described as being provided on the sleeve adjacent the teat engaging flange, it is also envisaged that the strengthening means instead of being provided on the sleeve may be provided on the teat engaging flange. However, when provided on the teat engaging flange, in general, it is believed that it would be preferable to provide the strengthening means at a radially outward location on the teat engaging flange for minimising any restriction which the strengthening means may impose on the axial flexibility of the teat engaging flange in order to permit axial deflection of the teat engaging flange in use. Where the strengthening means is located on the teat engaging flange, in general, it is envisaged that it would be provided by a strengthening ring or a strengthening portion of annular construction extending around the teat engaging flange, which would preferably extend around the teat engaging flange adjacent the sleeve.

It is also envisaged that the strengthening means may be provided at other suitable locations on the sleeve, for example, the strengthening means may be located on the sleeve at a location to coincide directly with the teat engaging flange.

While the milk liner has been described for use in milking cows, it will be readily apparent to those skilled in the art that the milk liner may be adapted for use in the milking of any type of animal, for example, sheep, goats, reindeer and the like. Needless to say, when adapted for milking other animals, the size and shape of the milk liner will be appropriately modified. Furthermore, where the milk liner is adapted for milking of other animals, the milking cluster will similarly be appropriately modified, and will comprise the appropriate number of milk liner assemblies.

While the milk liner has been described as comprising a sleeve of circular transverse cross-section, the sleeve may be of any other desired transverse cross-section, for example, square, rectangular, triangular, hexagonal, octagonal or indeed, any other desired cross-section. Needless to say, other aspects of the shape and dimensions of the milk liner may be varied.

It is envisaged that the milk liner according to the invention may be manufactured from other suitable materials besides a synthetic custom rubber compound. For example, the milk liner according to the invention may be manufactured from a thermoplastic elastomer, silicon rubber, or any other elastomeric type material. Additionally, while the milk liner according to the invention has been described as being integrally injection moulded in one piece, while this is desirable, the milk liner according to the invention need not necessarily be integrally formed in one piece, and additionally, the milk liner according to the invention may be formed by any other suitable manufacturing process besides injection moulding.

The invention claimed is:

1. A milk liner for a milk liner assembly of an animal milking system, the milk liner comprising:
   a resilient flexible elongated longitudinally extending sleeve forming a teat receiving cavity for receiving a teat of an animal's udder and defining a longitudinally extending central axis,
   a teat engaging flange extending circumferentially around and radially inwardly from the longitudinally extending sleeve, and forming with the longitudinally extending sleeve the teat receiving cavity, the teat engaging flange defining a teat accommodating opening therethrough for accommodating a teat into the teat receiving cavity, and
   a strengthening ring located on and extending circumferentially around the longitudinally extending sleeve adjacent the teat engaging flange with the teat engaging flange extending radially inwardly from the strengthening ring and from the longitudinally extending sleeve, the strengthening ring being integrally formed with the longitudinally extending sleeve and the teat engaging flange and being dimensioned to prevent radial inward contraction of the teat engaging flange onto a teat extending through the teat accommodating opening thereof and to permit axial deflection of the teat engaging flange inwardly and outwardly relative to the teat receiving cavity, the strengthening ring extending in a general direction parallel to the central axis from the end of the longitudinally extending sleeve adjacent the teat engaging flange and terminating in an abutment surface spaced apart radially outwardly from the portion of the teat engaging flange which deflects axially, so that the abutment surface undergoes minimal axial movement as the teat engaging flange deflects axially, the abutment surface being axially spaced apart from the teat engaging flange for abutting the udder of the animal, so that the strengthening ring forms a spacing means to space the teat engaging flange from the udder with the teat engaging flange spaced apart from a cricoid fold on the axial end of the cricoid fold opposite to the end thereof adjacent the udder, when the abutment surface engages the udder.

2. A milk liner as claimed in claim 1 in which the strengthening ring strengthens the longitudinally extending sleeve adjacent the teat engaging flange.

3. A milk liner as claimed in claim 1 in which the milk liner is adapted for fitting a teat of a cow.

4. A milk liner assembly comprising a milk liner as claimed in claim 1 and an outer shell within which the milk liner is sealably located, and defining with the outer shell an annular chamber to which a pulsating vacuum is applied.

5. A milking cluster comprising a plurality of milk liner assemblies as claimed in claim 4.

6. A milk liner as claimed in claim 1 in which the axial distance between the abutment surface of the strengthening ring and the teat engaging flange is in the range of 2 mm to 20 mm.

7. A milk liner as claimed in claim 1 in which the radial thickness of the strengthening ring is in the range of 2 mm to 20 mm.

8. A milk liner as claimed in claim 1 in which the milk liner is integrally moulded in one piece.

9. A method for preventing radial inward contraction, during milking of an animal, of a teat engaging flange of a milk liner onto a teat of an animal passing through a teat accommodating opening defined by the teat engaging flange, the method comprising providing a strengthening ring on a longitudinally extending sleeve of the milk liner extending circumferentially around the longitudinally extending sleeve adjacent the teat engaging flange with the teat engaging flange extending radially inwardly from the strengthening ring and from the longitudinally extending sleeve, dimensioning the strengthening ring to prevent radial inward contraction of the teat engaging flange onto a teat extending through the teat accommodating opening thereof and to permit axial deflection of the teat engaging flange inwardly and outwardly relative to the teat receiving cavity, providing the strengthening ring to extend in a general direction parallel to the central axis from the end of the longitudinally extending sleeve adjacent the teat engaging flange and terminating in an abutment surface spaced apart radially outwardly from the portion of the teat engaging flange which deflects axially, so that the abutment surface undergoes minimal axial movement as the teat engaging flange deflects axially, the abutment surface being axially spaced apart from the teat engaging flange for abutting the udder of the animal, so that the strengthening ring forms a spacing means for spacing the teat engaging flange from the udder with the teat engaging flange spaced apart from a cricoid fold on the axial end of the cricoid fold opposite to the end thereof adjacent the udder, when the abutment surface engages the udder, and integrally forming the strengthening ring with the longitudinally extending sleeve and the teat engaging flange.

10. A method as claimed in claim 9 in which the axial distance between the abutment surface of the strengthening ring and the teat engaging flange is in the range of 2 mm to 20 mm.

11. A method as claimed in claim 9 in which the milk liner is integrally moulded in one piece.

* * * * *